(12) United States Patent
Pamarti

(10) Patent No.: US 7,599,390 B2
(45) Date of Patent: Oct. 6, 2009

(54) APPROXIMATE BIT-LOADING FOR DATA TRANSMISSION OVER FREQUENCY-SELECTIVE CHANNELS

(75) Inventor: Sudhakar Pamarti, Mountain View, CA (US)

(73) Assignee: Rambus Inc., Los Altos, CA (US)

( * ) Notice: Subject to any disclaimer, the term of this patent is extended or adjusted under 35 U.S.C. 154(b) by 851 days.

(21) Appl. No.: 10/899,720

(22) Filed: Jul. 21, 2004

(65) Prior Publication Data

US 2006/0018344 A1    Jan. 26, 2006

(51) Int. Cl.
*H04J 3/00* (2006.01)
*H04J 9/00* (2006.01)
*H04J 3/02* (2006.01)

(52) U.S. Cl. .................. 370/464; 370/204; 370/537

(58) Field of Classification Search ............... None
See application file for complete search history.

(56) References Cited

U.S. PATENT DOCUMENTS

| | | | | |
|---|---|---|---|---|
| 5,235,612 A | * | 8/1993 | Stilwell et al. | 375/144 |
| 5,377,183 A | * | 12/1994 | Dent | 370/335 |
| 5,471,464 A | * | 11/1995 | Ikeda | 370/203 |
| 5,640,423 A | * | 6/1997 | Archer | 375/261 |
| 5,675,572 A | * | 10/1997 | Hidejima et al. | 370/206 |
| 5,805,567 A | * | 9/1998 | Ramesh | 370/204 |
| 6,356,555 B1 | * | 3/2002 | Rakib et al. | 370/441 |
| 6,373,827 B1 | * | 4/2002 | Tayebi et al. | 370/310 |
| 6,549,566 B1 | * | 4/2003 | Lee et al. | 375/219 |
| 6,778,102 B1 | * | 8/2004 | Grunnet-Jepsen et al. | 341/50 |
| 6,856,590 B2 | * | 2/2005 | Okada et al. | 370/208 |

(Continued)

FOREIGN PATENT DOCUMENTS

EP          0613 266 A    8/1994
WO          WO 01/29991 A    4/2001

OTHER PUBLICATIONS

Bingham, J.A.C., "Multicarrier Modulation for Data Transmission: An Idea Whose Time Has Come," *IEEE Communications Magazine*, vol. 28, No. 5, May 1, 1990, pp. 5-8, 11.

(Continued)

*Primary Examiner*—Chi H Pham
*Assistant Examiner*—Warner Wong
(74) *Attorney, Agent, or Firm*—Morgan, Lewis & Bockius LLP

(57) ABSTRACT

A high-speed communications system utilizes approximate bit-loading during data transmission in a channel. In one embodiment, a plurality of parallel data preparation circuits in a data transmission circuit receive respective subsets of a data stream, each of the respective subsets of the data stream having a data rate that is less than a data rate of the data stream. Converters in the data preparation circuits convert the respective subsets of the data stream into respective analog signals. Multipliers in the data preparation circuits multiply the respective analog signals by respective vectors to produce respective sub-channel signals. At least a frequency band in the spectrum corresponding to one of the respective sub-channel signals partially overlaps at least a frequency band for at least one other of the respective sub-channel signals. The respective sub-channel signals are combined prior to transmission.

39 Claims, 9 Drawing Sheets

U.S. PATENT DOCUMENTS

| | | | |
|---|---|---|---|
| 7,280,612 B2* | 10/2007 | Saed | 375/296 |
| 2002/0027950 A1* | 3/2002 | Matthews | 375/222 |
| 2003/0134607 A1* | 7/2003 | Raghavan et al. | 455/132 |
| 2004/0110519 A1 | 6/2004 | Chang et al. | |

OTHER PUBLICATIONS

Jongsun Kim et al., "A 2-GB/S/pin Source Synchronous CDMA Bus Interface with Simultaneous Multi-Chip Access and Reconfigurable I/O Capability", Proceedings, IEEE 2003 Custom Integrated Circuits Conference, Sep. 21-24, 2003, pp. 317-320.

Zhiwei Xu et al., "A 2.7 Gb/s CDMA-Interconnect Transceiver Chip Set with Multi-Level Signal Data Recovery for Re-configurable VLSI Systems", Proceedings, 2003 IEEE International Solid-State Circuits Conference, Feb. 9-13, 2003, Session 4, Paper 4.7.

Amir Amirkhany et al., "Multi-tone Signaling for High-speed Backplane Electrical Links", preprint, Feb. 29, 2004 (not published).

* cited by examiner

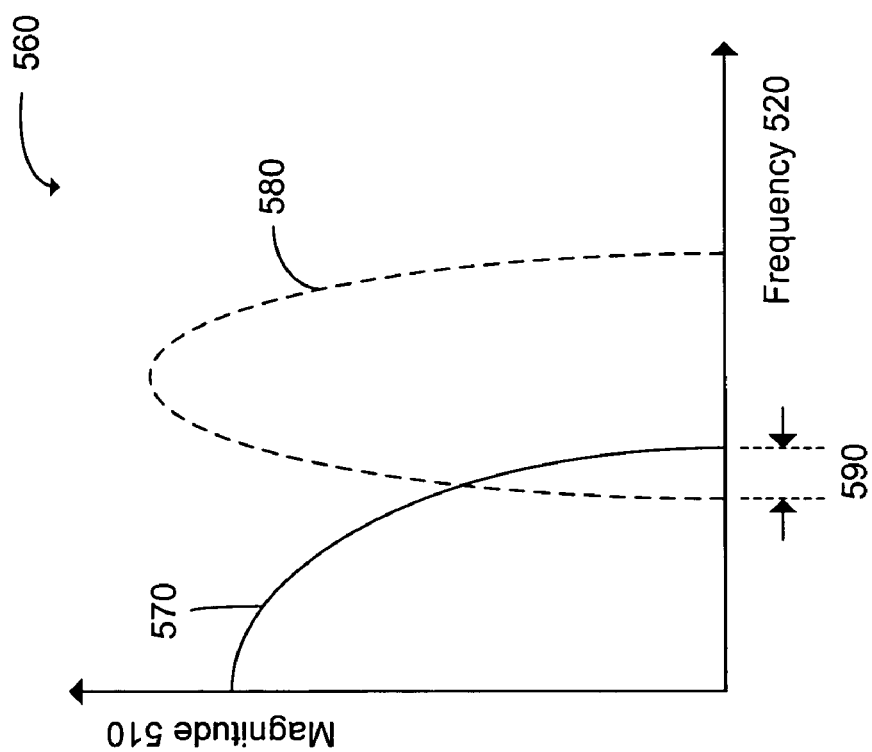
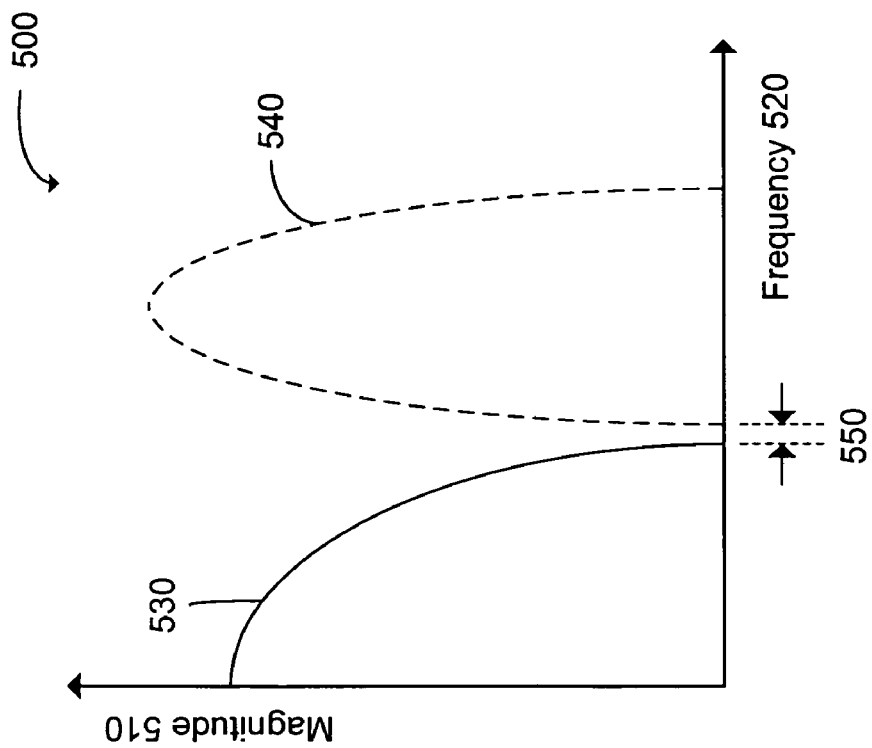

US 7,599,390 B2

APPROXIMATE BIT-LOADING FOR DATA TRANSMISSION OVER FREQUENCY-SELECTIVE CHANNELS

BRIEF DESCRIPTION OF THE INVENTION

The present invention relates generally to the communication of data. More specifically, the present invention relates to the communication of data over frequency-selective channels.

BACKGROUND OF THE INVENTION

Low bit-error-rate communication of data over a communications channel is an important requirement in communications systems. Fulfilling this requirement is increasingly difficult in high-speed communications systems with data rates exceeding multiple Gbits/s. In the case of an interface between semiconductor chips or dies, there is the additional problem associated with the highly frequency-selective transfer function of the communications channel. For lower speed communications systems, such as digital subscriber line (xDSL) and wireless local area network (WLAN) technologies, solutions for this problem include bit-loading and multiple-carrier communications techniques. These approaches achieve higher data rates over a communications channel with a frequency-selective transfer function through an improved utilization of the available bandwidth. In particular, the available bandwidth is divided into multiple frequency sub-bands (the multiple-carrier principle) and more information is transmitted in those sub-bands that suffer less attenuation and less information is transmitted in those sub-bands that suffer more attenuation (the bit-loading principle). There are several existing implementations of bit-loading and multiple-carrier communications techniques.

FIG. 1 illustrates one implementation of these techniques, an analog multi-tone system 100. During data transmission, respective subsets 110a-110m (collectively 110), of a data stream are converted to analog signals in digital-to-analog (D/A) converters 120a-120m (collectively 120). The analog signals are multiplied in multipliers 126a-126m (collectively 126) by sinusoids having different frequencies and phases provided by sinusoid generators 130a-130m (collectively 130) to produce respective sub-channel signals. In the frequency domain, the spectrum corresponding to the analog signals is therefore shifted to frequency sub-bands centered on the different carrier frequencies. The respective sub-channel signals are then filtered using steep band-pass filters 140a-140m (collectively 140) to ensure precise bit-loading. The respective sub-channel signals are then combined by a summing or other combining circuit 150 and transmitted through a channel 152.

FIG. 4a illustrates the magnitude 510 as a function of frequency 520 of the spectrum 500 corresponding to the respective sub-channel signals in precise bit-loading. The overlap of a first frequency band 530 and a second frequency band 540 is such that any signal loss due to the overlap is substantially less than the noise floor. For example, the amount of power in the first frequency band 530 that overlaps the second frequency band 540 may be less than 1 percent, and in many implementations is less than 0.1 percent. The amount of overlap, if any, depends on the implementation, the frequency selectivity of the channel 152 and a target data rate. In this document, frequency bands with power overlaps of less than 1 percent are considered to not overlap. In this illustration, there is a gap 550 between the first frequency band 530 and the second frequency band 540.

Referring back to FIG. 1, during data receiving, signals transmitted through the channel 152 are filtered by steep bandpass filters 154a-154m (collectively 154). The resulting respective sub-channel signals are multiplied in multipliers 160a-160m (collectively 160) by sinusoids having different frequencies and phases provided by sinusoid generators 170a-170m (collectively 170) to produce respective analog signals. The respective analog signals are integrated in integrators 174a-174m (collectively 174) to produce respective integrated analog signals. Conversion of the respective integrated analog signals by analog-to-digital (A/D) converters 180a-180m (collectively 180) produces respective subsets 190a-190m (collectively 190) of the data stream. When the system 100 is operating properly, subsets 190a-190m are substantially the same, and preferably substantially identical, to subsets 110a-110m.

The analog multi-tone system 100, however, is difficult and expensive to implement in high-speed communications systems including those with data rates exceeding multiple Gbits/s. The steep bandpass filters 140 and 154 are the primary obstacles in realizing this technique at high data rates. There is a need, therefore, for an improved bit-loading technique for data transmission in high-speed communications systems.

BRIEF DESCRIPTION OF THE DRAWINGS

For a better understanding of the invention, reference should be made to the following detailed description taken in conjunction with the accompanying drawings, in which:

FIG. 4a is a schematic illustrating the spectrum in existing precise bit-loading techniques.

FIG. 4b is a schematic illustrating the spectrum in an embodiment of the approximate bit-loading technique.

Like reference numerals refer to corresponding parts throughout the drawings.

DETAILED DESCRIPTION OF THE PREFERRED EMBODIMENTS

In one embodiment of the present invention, a plurality of parallel data preparation circuits in a data transmission sub-system receive respective subsets of a data stream, the respective subsets of the data stream each having a data rate that is substantially less than a data rate of the data stream. Converters in the data preparation circuits convert the respective subsets of the data stream into respective analog signals. Multipliers in the data preparation circuits multiply the respective analog signals by respective vectors to produce respective sub-channel signals. The respective vectors correspond to sequences of N elements. Each of the respective vectors is orthogonal to the respective vectors used by the multipliers in each of the other data preparation circuits during a finite time interval corresponding to each of the sequences of N elements. The respective sub-channel signals are combined prior to transmission.

In an additional embodiment, a plurality of parallel data receiving circuits in a data receiving subsystem receive a common input signal. Multipliers in the data receiving circuits multiply the common input signal by respective vectors to produce respective sub-channel signals. The respective vectors correspond to sequences of N elements. Each of the respective vectors is orthogonal to the respective vectors used by the multipliers in each of the other data preparation circuits during a finite time interval corresponding to each of the sequences of N elements. Integrators in each of the data receiving circuits integrate the respective sub-channel signals to produce respective integrated sub-channel signals, the respective integrated sub-channel signals each having a data rate that is substantially less than a data rate of the common input signal. Converters in the data receiving circuits convert the respective integrated sub-channel signals into digital signals.

Reference will now be made in detail to embodiments of the invention, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

Figure 2:
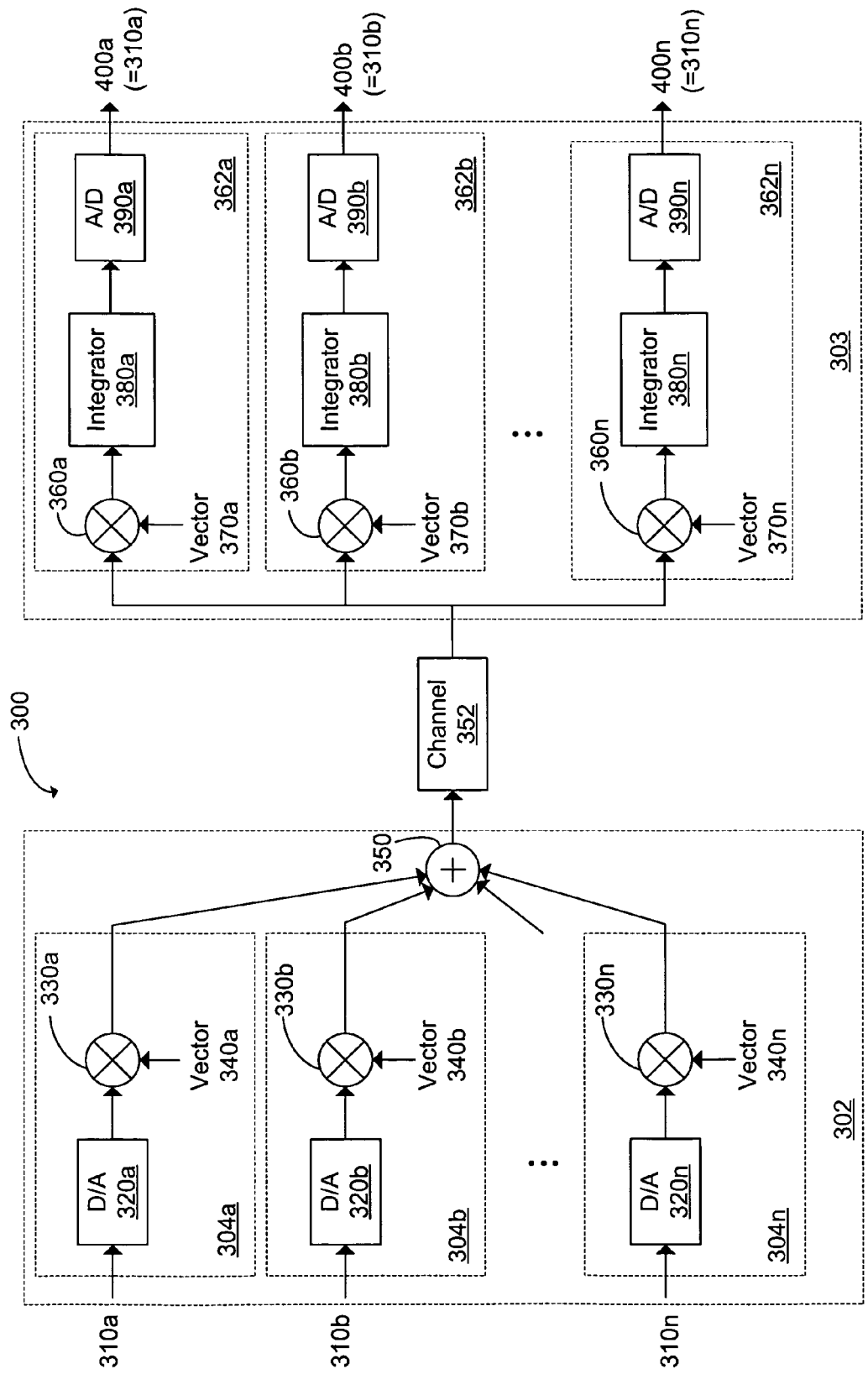
FIG. 2 is a block diagram illustrating an embodiment of the approximate bit-loading technique.

FIG. 2 illustrates a system 300 for an embodiment of the approximate bit-loading technique. During data transmission, respective subsets 310a-310n (collectively 310) of a data stream are coupled to a plurality of parallel data preparation circuits 304a-304n (collectively 304) in a data transmission subsystem 302 (also herein called the data transmission circuit). Each of the respective subsets 310 of the data stream has a data rate that is substantially less, e.g., 10 percent to 95 percent less, than a data rate of the data stream. The data rates of the respective subsets 310 will depend on the number of subsets and how the bits of the data stream are distributed over the subsets 310. In some embodiments, each of the subsets 310 has a data rate that is at least 50 percent less than the data rate of the data stream.

Digital-to-analog (D/A) converters 320a-320n (collectively 320) convert the respective subsets 310 of the data stream into respective analog signals. The respective analog signals are multiplied in multipliers 330a-330n (collectively 330) by respective vectors 340a-340n (collectively 340) to produce respective sub-channel signals. The number (n) of vectors 340 and data preparation circuits 304 may vary from one implementation to another. In some embodiments, the number is at least two and less than or equal to thirty-two.

The respective vectors 340 correspond to sequences of N elements. Each of the respective vectors 340 is orthogonal to the respective vectors 340 used by the multipliers 330 in each of the other data preparation circuits during a finite time interval corresponding to each of the sequences of N elements. The respective sub-channel signals are combined in a combiner 350, e.g., an analog summing circuit, prior to transmission through a channel 352.

Figure 1:
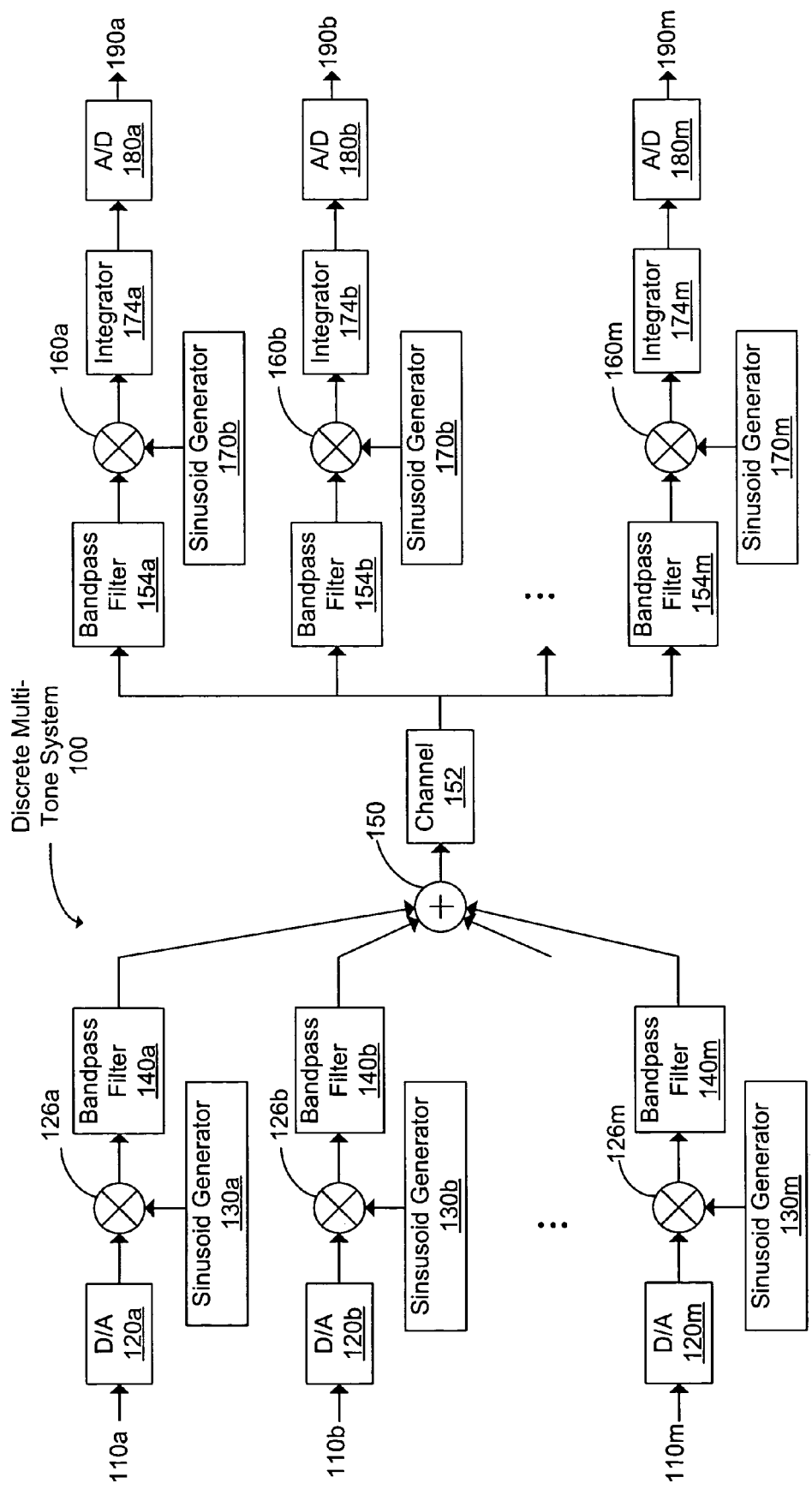
FIG. 1 is a block diagram illustrating an existing analog multi-tone system.

As in the analog multi-tone system 100 shown in FIG. 1, multiplying the respective analog signals by the respective vectors 340 in the system 300 shifts the spectrum corresponding to the analog signals. In contrast with previous approaches, however, the elimination of bandpass filters and the characteristics of the respective vectors 340 in the system 300 results in substantial overlap of the frequency bands in the spectrum. This is illustrated in FIG. 4b, which shows the magnitude 510 as a function of frequency 520 of a spectrum 560 corresponding to the respective sub-channel signals. There is an overlap 590 of a first frequency band 570 and a second frequency band 580. The orthogonality of the respective vectors 340, however, ensures that respective sub-channel signals can be extracted from the combined signals received by data receiving subsystems 303 (FIG. 2).

In general, the spectrum 560 corresponding to one of the respective sub-channel signals may contain a group of frequency bands. In the context of the approximate bit-loading embodiments described here, a substantial overlap 590 exists for at least one of those frequency bands and at least one frequency band corresponding to another of the respective sub-channel signals. In this context, a substantial overlap is defined to mean that the amount of power in the first frequency band 570 that overlaps the second frequency band 580 is greater than 5 percent, and in many implementations is greater than or equal to 10 percent. The amount of overlap 590, if any, depends on the implementation, the frequency selectivity of the channel 352 (FIG. 2) and the target data rate.

In the system 300 (FIG. 2), the spectrum 560 corresponding to the respective sub-channel signals may be adjusted by using bit-to-symbol coding, where one or more bits are mapped together to a multi-level symbol in the respective subsets 310 of the data stream (FIG. 2) such that some of the respective subsets 310 (FIG. 2) convey more information per unit time than others. For example, a group of two bits can be mapped to one of four different amplitudes of a voltage pulse signal, one of four different phases of a sinusoid or a combination of one of two different amplitudes of a sinusoid and one of two different phases of the same sinusoid. For example if the initial data stream has ten bits per time unit (e.g., nanosecond), and those ten bits are allocated to eight data preparation circuits 304, with six of the circuits 304 each receiving a single bit per time unit and two of the circuits 304 each receive two bits per time unit, the latter two data preparation circuits 304 will each perform a two-bit to symbol coding. Furthermore, the D/A conversion rate for all eight of the data preparation circuits 304 will be one tenth of the aggregate data rate.

Each of the respective subsets 310 (FIG. 2) of the data stream has a data rate that is less than the data rate of the data stream. In this way, the spectrum 560 corresponding to the respective sub-channel signals and thus the signals transmitted may be adjusted to appropriately match the transmission characteristics of the channel 352 (FIG. 2), including one with a highly frequency-selective transfer function. In an alternate embodiment, the spectrum 560 may be adjusted by allocating or demultiplexing bits at different data rates for at least one of the respective subsets 310 of the data stream (FIG. 2).

The transfer function of the channel 352 (FIG. 2) may be characterized initially, e.g., determined during by a calibration process, and the spectrum 560 may be set to a desired form and subsequently fixed. Alternatively, a training sequence may be transmitted by the data transmission circuit to determine the transfer function of the channel 352 (FIG. 2) and the spectrum 560 may be adjusted to the desired form using a feedback mechanism, for example, by adjusting the bit-to-symbol coding in the respective subsets 310 of the data stream (FIG. 2).

Figure 5:
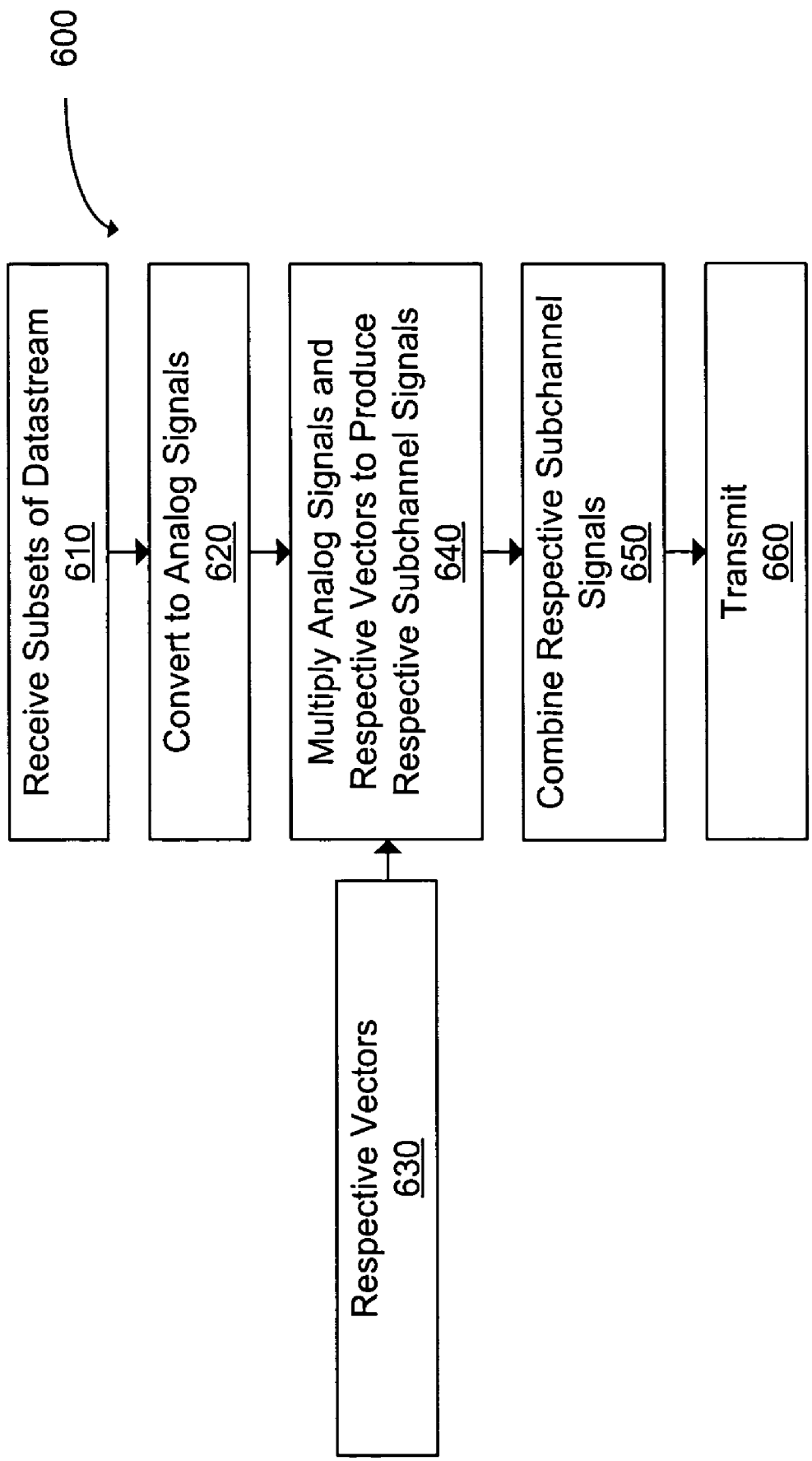
FIG. 5 is a flow diagram illustrating an embodiment of the transmission of data in the approximate bit-loading technique.

FIG. 5 is a flow chart 600 of the data transmission process used in some embodiments. Subsets of the data stream are received 610. These are converted 620 to analog signals. The analog signals are multiplied 640 by respective vectors 630 to produce respective sub-channel signals. The respective sub-channel signals are combined 650 and transmitted 660. It may be noted that performing the digital to analog conversion 620 prior to multiplying 640 the subset signals by the respective vectors results in a lower D/A conversion rate than if these operations were performed in the opposite order. Because very high rate D/A converters are more expensive than lower rate D/A converters, this methodology reduces the cost of the circuitry required to implement this data transmission methodology. Note that this methodology results in a D/A conversion rate which is at least n times lower than the aggregate data rate of system 300 (FIG. 2), where n is the number of subsets 310 of the data stream (FIG. 2).

Referring back to FIG. 2, during data receiving a common input signal is coupled to a plurality of data receiving circuits 362a-362n (collectively 362) in the data receiving subsystem 303. The common input signal is multiplied using multipliers 360a-360n (collectively 360) in the data receiving circuits 362 by respective vectors 370a-370n (collectively 370) to produce respective sub-channel signals. Once again, the respective vectors 370 correspond to the sequences of N elements. In some embodiments, each of the respective vectors 370 is the same as a corresponding vector 340 in the data transmission subsystem 302. Each of the respective vectors 370 is orthogonal to the respective vectors 370 used by the multipliers 360 in each of the other data receiving circuits 362 during the finite time interval corresponding to each of the sequences of N elements. Integrators 380a-380n (collectively 380) in each of the data receiving circuits 362 integrate the respective sub-channel signals for a length of time (also known as an integration period) corresponding to the finite time interval to produce respective integrated sub-channel signals, each of the respective integrated sub-channel signals having a data rate that is less than a data rate of the common input signal. In some embodiments, the integrators 380 are implemented using so-called integrate and dump circuits. In some embodiments, the integrators 380 are reset after each integration period. The integrators 380 transfer the respective integrated sub-channel signals to analog-to-digital (A/D) converters 390a-390n (collectively 390), which convert the respective integrated sub-channel signals into respective subsets 400a-400n (collectively 400) of the data stream. When the data transmission subsystem 302 and the data receiving subsystem 303 are operating properly, the recovered subsets 400 are substantially the same as the corresponding data sets 310.

Figure 6:
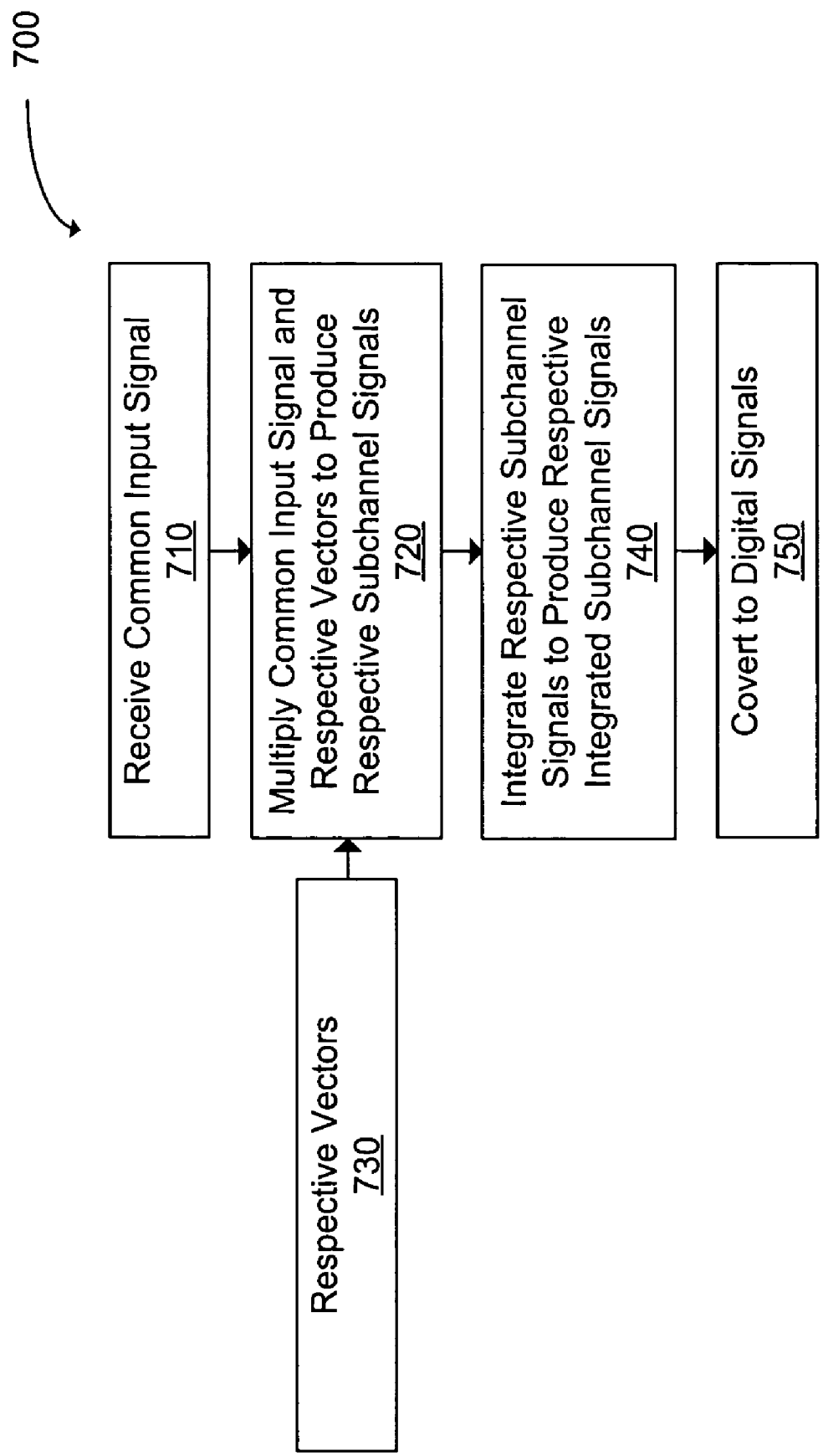
FIG. 6 is a flow diagram illustrating an embodiment of the receiving of data in the approximate bit-loading technique.

FIG. 6 is a flow chart 700 of the data receiving process used in some embodiments. A common input signal is received 710. The common input signal is multiplied 720 by respective vectors 730 to produce respective sub-channel signals. The respective sub-channel signals are integrated 740 to produce respective integrated sub-channel signals. In some embodiments, the integration is reset or dumped after each integration period. The respective integrated sub-channel signals are converted 750 into digital signals. Noted that performing the A/D conversion 750 after multiplying 720 the common input signal by the respective vectors and integrating 740 the respective sub-channel signals results in a A/D conversion rate which is at least n times lower than the aggregate data rate of the system 300 (FIG. 2).

Referring back to FIG. 2, the characteristics of the respective vectors 340 and 370 used by the data transmission subsystem 302 and the data receiving subsystem 303 are the same and described below. Mathematically, each of the respective subsets 310 and 400 of the data stream may be represented by a train of pulses $$d_i(t) = \sum_{n=-\infty}^{\infty} d_i[n] \cdot g(t - nTsym),$$

where $d_i[n]$ are the samples of one of the respective subsets 310 and 400 of the data stream arriving once every Tsym seconds and g(t) is a function having any suitable shape, for example, a rectangular pulse of duration Tsym. Each of the respective vectors 340 and 370 may be represented by $$c_i(t) = \sum_{n=-\infty}^{\infty} \sum_{m=0}^{N-1} H_i[m] \cdot p(t - nTsym - mTchip),$$

where $H_i[m]$ is an element in one of the sequences with a number of elements N and p(t) is a rectangular pulse of unity height and duration Tchip. Note that each of the respective vectors 340 and 370 cyclically repeats with a period Tsym. Also note that Tsym may be an integer multiple of Tchip. In an exemplary embodiment, Tsym equals N times Tchip.

From this description, in one embodiment the respective vectors 340 and 370 may be analog signals based on the sequences. In an alternative embodiment, the multiplication in the data transmission and data receiving circuits may use a digital representation of the respective vectors 340 and 370.

In another embodiment, an inverse of the data rate of the data stream may be an integer multiple of a bit time, i.e., Tsym, for each of the respective subsets 310 and 400 of the data stream. The integer multiple may be an even integer. In an exemplary embodiment, the integer multiple is N.

In yet another embodiment, the finite time over which the respective vectors 340 and 370 in FIG. 2 are orthogonal to other respective vectors 340 and 370, and the finite time that the integrators 380 integrate the respective sub-channel signals may correspond to, or be substantially equal to N times a bit time, i.e., Tchip, for the respective vectors 340 and 370. In addition, the inverse of the data rate of the common input signal may be an integer multiple of a bit time of the respective vectors 340 and 370. The integer multiple may be an even integer. In an exemplary embodiment, the integer multiple is N.

Each element of the sequences of N elements may be binary numbers and each element of the respective vectors 340 and 370 may correspond to one of two voltage levels. In an exemplary embodiment, each of the sequences corresponds to a row of a Hadamard matrix of order N, where the number of elements N in a row is an even integer. The N value chosen is limited by the overall latency and circuit complexity, i.e., the number of parallel data preparation 304 and data receiving 306 circuits. A binary Hadamard matrix of order 8 (i.e., N equal to 8) represents a reasonable tradeoff between latency, circuit complexity, the overlap 590 (FIG. 4) of the frequency bands in the spectrum 560 (FIG. 4) and the data rate of the respective subsets 310 and 400 of the data stream (and, thus, the speed of D/A converters 320 and A/D converters 390). In this exemplary embodiment, the integrators 380 may integrate the respective sub-channel signals for the finite time, corresponding to 8 times Tchip, before transferring the respective integrated sub-channel signals to a next circuit.

Some embodiments may use sequences with non-binary elements and respective vectors 340 and 370 with elements having more than two voltage levels. This will, however, make the multiplication of the respective analog signals and the respective vectors 340 and the common input signal and the respective vectors 370 more complex. As an example, each element of the sequences may be ternary numbers and each element of the respective vectors 340 and 370 may correspond to one of three voltage levels. Other suitable sequences include binary pseudorandom sequences such as maximal length sequences (m-sequences), Gold codes and Kasami sequences.

Figure 3:
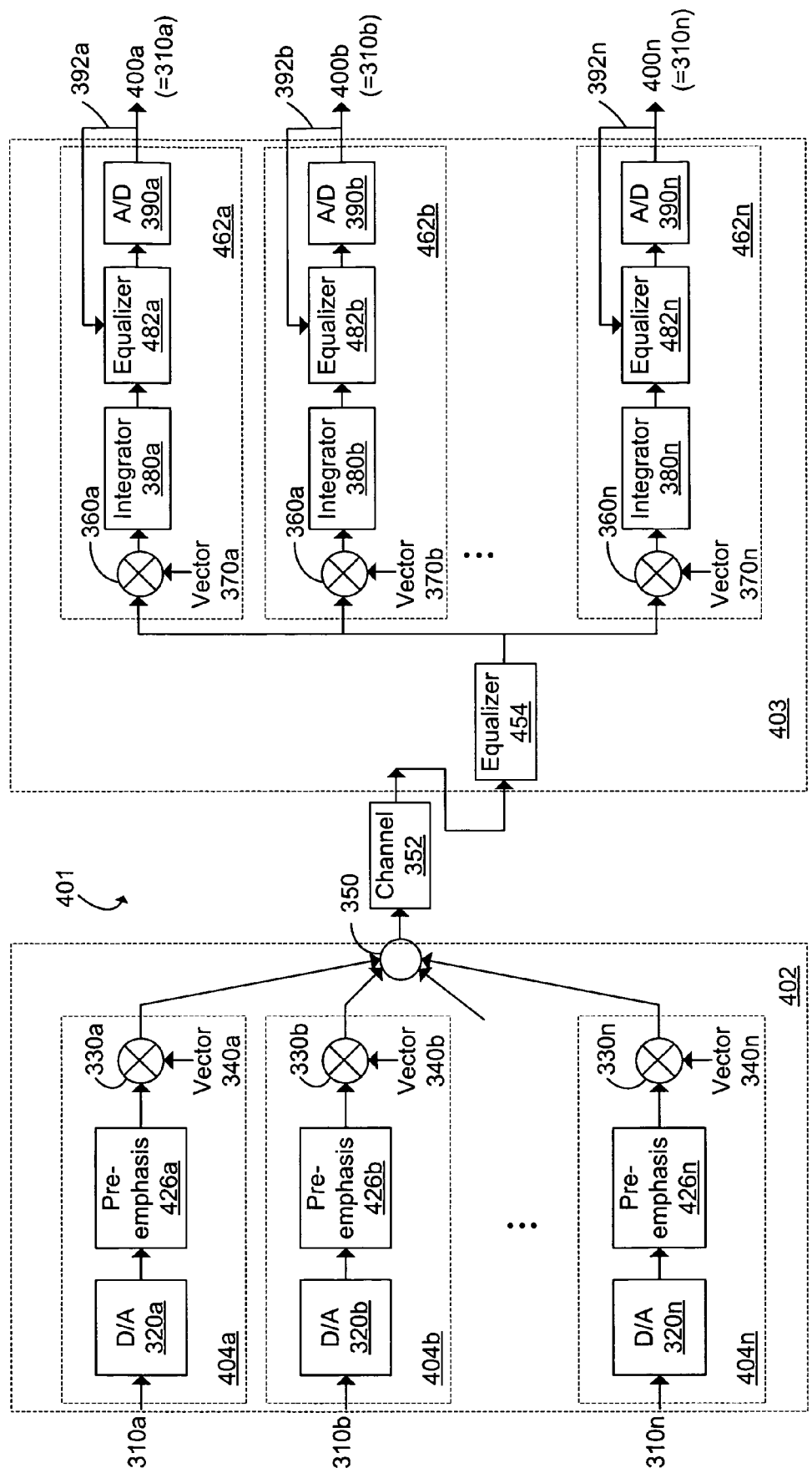
FIG. 3 is a block diagram illustrating another embodiment of the approximate bit-loading technique.

Several alternative embodiments are shown in the system 401 in FIG. 3. Pre-emphasis filters 426*a*-426*n* (collectively 426) may be included in each of the data preparation circuits 404 of the data transmission subsystem 402. At the data receiving subsystem 403, the common input signal may be equalized with an equalizer 454. In addition, equalizers 482*a*-482*n* (collectively 482) may be placed in each of the data receiving circuits 462*a*-462*n* (collectively 462). The equalizers 454 and 482 may be implemented as feed-forward filters, as decision feedback equalization circuits, or as a combination of both.

Figure 7:
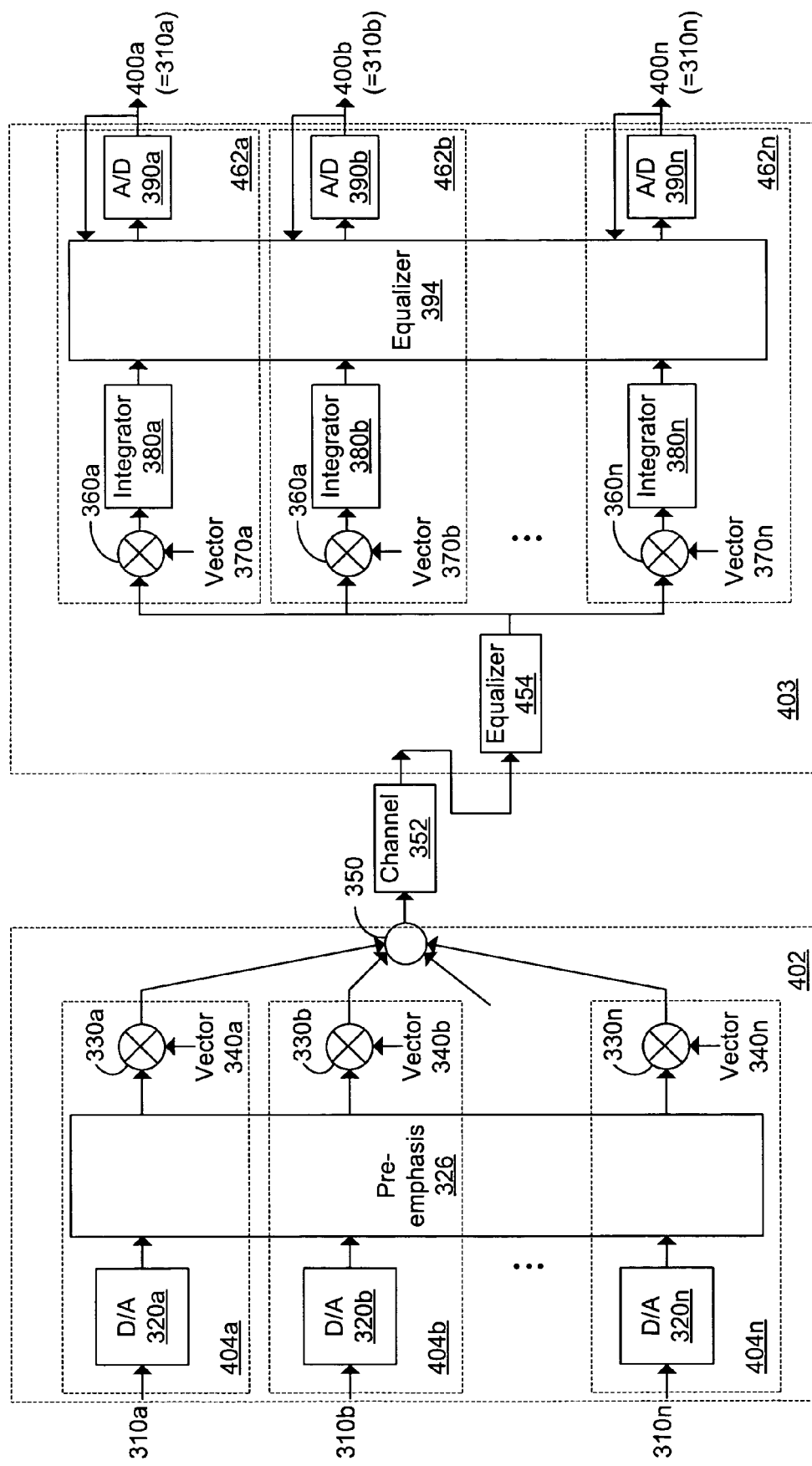
FIG. 7 is a block diagram illustrating an embodiment of the approximate bit-loading technique.

In an alternative embodiment, the pre-emphasis filters 426 may be combined into a single pre-emphasis block 326, with one or more of the outputs from the D/A converters 320 as inputs to the pre-emphasis block 326, as shown in FIG. 7. Referring back to FIG. 3, in an alternative embodiment pre-emphasis may be applied to the data stream prior to the D/A conversion of the respective subsets 310 of the data stream. In an additional embodiment, the pre-emphasis filters 426 may be combined with the D/A converters 320.

In an additional embodiment, equalization in the data receiving subsystem 403 may be implemented using the equalizers 482 in the data receiving circuits 462, but without using equalizer 454. Alternatively, equalization may be implemented using only equalizer 454, without using equalizers 482. In an additional embodiment, equalization may be implemented using equalizers 482 with both the respective sub-channel signals and the digital outputs 400 as inputs, using optional feedback 392, as shown in FIG. 3. Referring to FIG. 7, in an additional embodiment equalization may be implemented using a single equalizer 394 with one or more of the respective sub-channel signals and, optionally, one or more of the digital outputs 400 as inputs.

Figure 8:
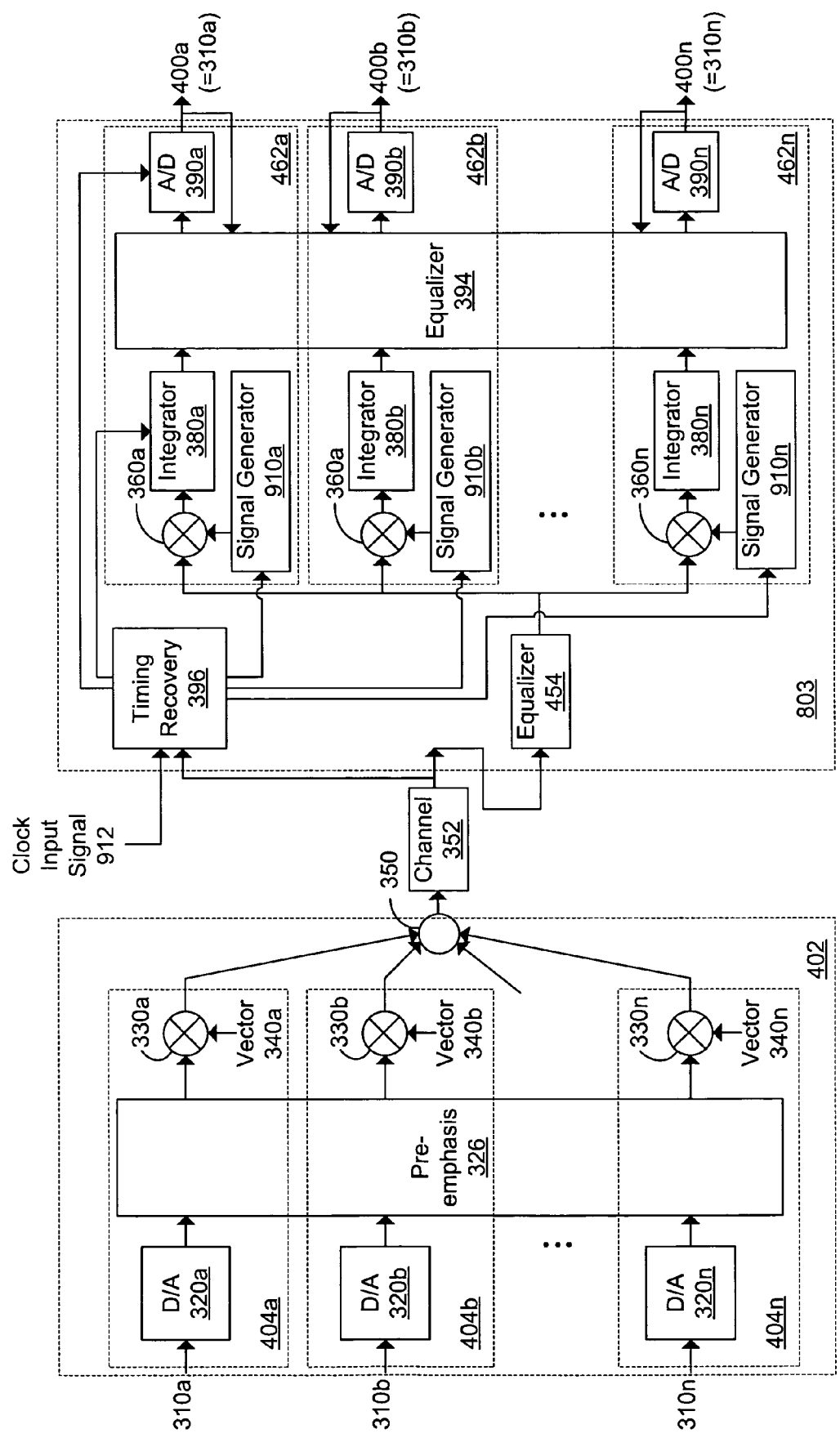
FIG. 8 is a block diagram illustrating an embodiment of the approximate bit-loading technique.

Referring to FIG. 8, in some embodiments a timing recovery mechanism 396 in data receiving subsystem 803 may determine synchronization information from the common input signal and couple the synchronization information to at least one of the integrators 380 and at least one of the A/D converters 390. Typically, the synchronization information would be used to control each of the integrators 380 and each the A/D converters 390. The synchronization information from the timing recovery mechanism 396 may also adjust a phase of at least one of the signal generators 910 that generates the respective vectors corresponding to sequences of N elements (thereby allowing the phase of one or more of the respective vectors to be adjusted). In some embodiments, the signal generators 910 may be implemented as a single signal generator. In yet another embodiment, the data receiving circuits 362 (FIG. 2) and 462 (FIG. 3) may receive synchronization information from the timing recovery mechanism 396 based on an optional clock input signal 912 from an external source and the common input signal.

Figure 9:
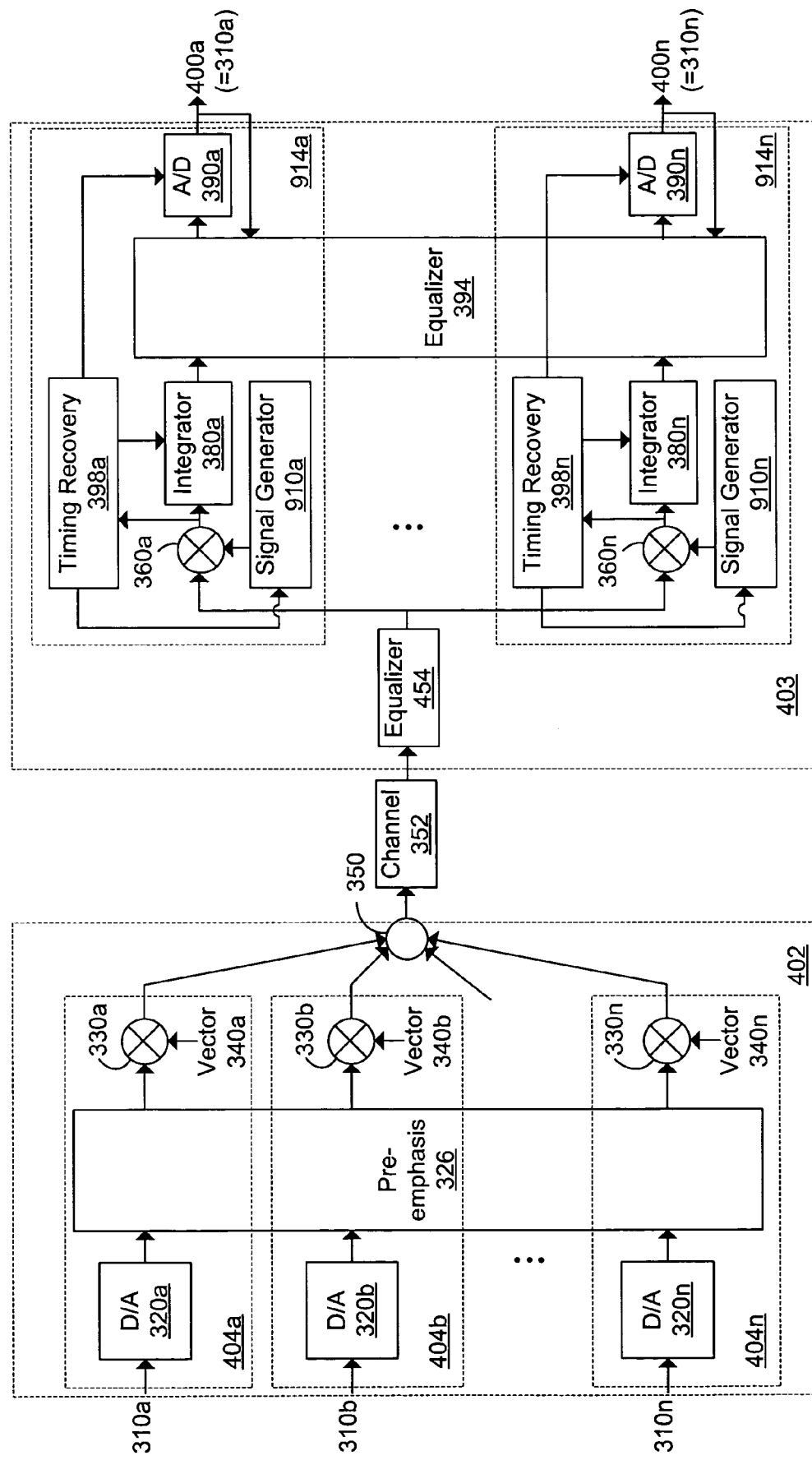
FIG. 9 is a block diagram illustrating an embodiment of the approximate bit-loading technique.

FIG. 9 illustrates a plurality of timing recovery mechanisms 398 that may be included in the data receiving circuits 914 and may determine synchronization information from the respective sub-channel signals and couple the synchronization information to the respective integrators 380, A/D converters 390 and/or signal generators 910. Coupling the synchronization information to the signal generators 910 allows the phase of the respective vectors to be adjusted. In some embodiments, the plurality of timing recovery mechanisms 398 may determine synchronization information from the respective integrated sub-channel signals.

Phase differences between at least two of the sub-channel signals may develop due to dispersion in the channel 352. These phase differences may be mitigated by adjusting the synchronization information. Specifically, phase differences between at least two of the respective sub-channel signals may be mitigated by varying the phase of at least one of the respective vectors multiplying the common input signal by modifying the synchronization information to one of the signal generators 910.

By allowing substantial overlap 590 (FIG. 4*b*) of the frequency bands in the spectrum 560 (FIG. 4*b*) of the respective sub-channel signals, the approximate bit-loading technique described herein eliminates the steep bandpass filters 140 and 154 (FIG. 1). This approximate bit-loading technique allows the advantages of bit-loading, such as roughly matching the spectrum 560 (FIG. 4*b*) of the respective sub-channels to the highly frequency-selective transfer functions of a communications channel 352 (FIG. 2), to be employed in high-speed communications systems.

The approximate bit-loading apparatus and method are well-suited for use in the interface between semiconductor chips or dies, such as electronic interconnects. In particular, the approximate bit-loading apparatus and method are well-suited for use in improving communication between semiconductor chips on the same printed circuit board (PCB) or between semiconductor chips on different printed circuit boards that are connected through a backplane or a coaxial cable at data rates exceeding multiple Gbit/s. The approximate bit-loading apparatus and method are also well-suited for use in improving communication between a memory controller chip and a dynamic random access memory (DRAM) chip. The DRAM chip may be either on the same printed circuit board as the controller or embedded in a memory module. In addition, the approximate bit-loading apparatus and method are also well-suited for use in improving communication at data rates exceeding multiple Gbit/s between a buffer chip and a DRAM chip, both of which are on the same memory module. The apparatus and methods described herein may also be applied to other memory technologies, such as static random access memory (SRAM) and electrically erasable programmable read-only memory (EEPROM).

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A data transmission circuit, comprising:
   a plurality of parallel data preparation circuits, each data preparation circuit including:
      a digital to analog converter configured to receive a respective subset of a data stream and to convert the respective subset of the data stream into a respective unmodulated analog signal, wherein the respective subset of the data stream has a respective data rate substantially less than a data rate of the data stream; and a multiplier for multiplying the respective analog signal by a respective vector to produce a respective sub-channel signal, wherein the respective vector corresponds to a sequence of N elements and the respective vector used by the multiplier in each of the plurality of data preparation circuits is substantially orthogonal to respective vectors used by multipliers in each of the other data preparation circuits, and wherein the respective vectors are substantially orthogonal during a finite time interval corresponding to each sequence of N elements; and a combiner for combining respective sub-channel signals prior to transmission;

wherein each respective sub-channel signal corresponds to a group of frequency bands at least one of which substantially overlaps a frequency band for at least one other respective sub-channel signal.

2. The data transmission circuit of claim 1, wherein the finite time interval is substantially equal to N times a bit time for the respective vector.

3. The data transmission circuit of claim 1, wherein an inverse of the data rate of the data stream is an integer multiple of a bit time of the respective subset of the data stream.

4. The data transmission circuit of claim 1, wherein N is an even integer.

5. The data transmission circuit of claim 1, wherein each element of each sequence is a binary number and each element of the respective vectors corresponds to one of two voltage levels.

6. The data transmission circuit of claim 1, wherein the sequence corresponds to a row of a Hadamard matrix of order N.

7. The data transmission circuit of claim 1, further comprising one or more pre-emphasis filters in the data transmission circuit.

8. The data transmission circuit of claim 1, further comprising a multiple-input, multiple-output pre-emphasis filter in the data transmission circuit.

9. A data receiving subsystem, comprising:

a plurality of parallel data receiving circuits, each having an input coupled to a input node for receiving a common input signal, each data receiving circuit including:

a multiplier for multiplying the common input signal by a respective vector to produce a respective sub-channel signal, wherein the respective vector corresponds to a sequence having N elements and the respective vector used by the multiplier in each of the plurality of data receiving circuits is substantially orthogonal to respective vectors used by the multipliers in each of the other data receiving circuits, and wherein the respective vectors are substantially orthogonal during a finite time interval corresponding to each sequence of N elements;

a timing recovery mechanism to determine synchronization information from the respective sub-channel signal produced by the multiplier;

an integrator for integrating the respective sub-channel signal in accordance with the synchronization information determined by the timing recovery mechanism to produce a respective integrated sub-channel signal, wherein the respective integrated sub-channel signal has a data rate substantially less than a data rate of the common input signal; and a converter configured to convert the respective integrated sub-channel signal into a digital signal.

10. The data receiving subsystem of claim 9, wherein the respective sub-channel signal corresponds to at least one frequency band that at least partially overlaps a frequency band for at least one other respective sub-channel signal.

11. The data receiving subsystem of claim 9, wherein the respective sub-channel signal corresponds to a group of frequency bands at least one of which substantially overlaps a frequency band for at least one other respective sub-channel signal.

12. The data receiving subsystem of claim 9, wherein the sequence corresponds to a row of a Hadamard matrix of order N.

13. The data receiving subsystem of claim 9, farther comprising a receiver equalization filter after the input node and before the input of each of the data receiving circuits.

14. The data receiving subsystem of claim 9, further comprising a plurality of receiver equalization filters, including a respective receive equalization filter in each of the data receiving circuits.

15. The data receiving subsystem of claim 9, farther comprising a single multiple-input, multiple-output equalization filter coupled to the converter of at least two of the parallel data receiving circuits.

16. The data receiving subsystem of claim 9, further comprising a clock circuit configured to receive a clock input signal from an external source that also generates the common input signal using the clock input signal.

17. A method of transmitting data, comprising:

receiving a plurality of subsets of a data stream, wherein each of the respective subsets of the data stream has a respective data rate substantially less than a data rate of the data stream;

converting each of the respective subsets of the data stream into a respective unmodulated analog signals;

multiplying each of the respective analog signals by a respective vector to produce a respective sub-channel signal, wherein the respective vector corresponds to a sequence having N elements and the respective vector is substantially orthogonal to respective vectors used for multiplying each of the other respective analog signals, and wherein the respective vectors are substantially orthogonal during a finite time interval corresponding to each sequence of the N elements; and combining the respective sub-channel signals prior to transmission;

and further comprising allocating portions of the data stream to form the respective subsets of the data stream such that spectral content of resulting respective sub-channel signals substantially corresponds to a transfer function of a transmission channel.

18. The method of transmitting data in claim 17, wherein the finite time interval is substantially equal to N times a bit time for the respective vector.

19. The method of transmitting data in claim 17, wherein an inverse of the data rate of the data stream is an integer multiple of a bit time of each of the respective subsets of the data stream.

20. The method of transmitting data in claim 17, wherein N is an even integer.

21. The method of transmitting data in claim 17, wherein each element of each sequence is a binary number and each element of the respective vectors corresponds to one of two voltage levels.

22. The method of transmitting data in claim 17, wherein each respective sub-channel signal corresponds to at least one frequency band that at least partially overlaps a frequency band for at least one other respective sub-channel signal.

23. The method of transmitting data in claim 17, wherein each respective sub-channel signal corresponds to a group of frequency bands at least one of which substantially overlaps a frequency band for at least one other respective sub-channel signal.

24. The method of transmitting data in claim 17, wherein the sequence corresponds to a row of a Hadamard matrix of order N.

25. The method of transmitting data in claim 17, further comprising pre-emphasizing each of the respective subsets of the data stream prior to converting each of the respective subsets of the data stream into the respective analog signals.

26. A method of transmitting data, comprising:
   receiving a plurality of subsets of a data stream, wherein each of the respective subsets of the data stream has a respective data rate substantially less than a data rate of the data stream;
   coding respective subsets of the data stream using a bit-to-symbol code such that respective subsets of the data stream convey different amounts of information per unit time than other respective subsets of the data stream, thereby producing a spectrum corresponding to the resulting respective sub-channel signals that substantially corresponds to a transfer function of a communications channel;
   converting each of the respective subsets of the data stream into a respective unmodulated analog signals;
   multiplying each of the respective analog signals by a respective vector to produce a respective sub-channel signal, wherein the respective vector corresponds to a sequence having N elements and the respective vector is substantially orthogonal to respective vectors used for multiplying each of the other respective analog signals, and wherein the respective vectors are substantially orthogonal during a finite time interval corresponding to each sequence of the N elements; and
   combining the respective sub-channel signals prior to transmission.

27. A method of transmitting data, comprising:
   receiving a plurality of subsets of a data stream, wherein each of the respective subsets of the data stream has a respective data rate substantially less than a data rate of the data stream;
   converting each of the respective subsets of the data stream into a respective unmodulated analog signals;
   multiplying each of the respective analog signals by a respective vector to produce a respective sub-channel signal, wherein the respective vector corresponds to a sequence having N elements and the respective vector is substantially orthogonal to respective vectors used for multiplying each of the other respective analog signals, and wherein the respective vectors are substantially orthogonal during a finite time interval corresponding to each sequence of the N elements; and
   combining the respective sub-channel signals prior to transmission;
   and further comprising demultiplexing the data stream to form the respective subsets of the data stream such that spectral content of resulting respective sub-channel signals substantially corresponds to a transfer function of a transmission channel.

28. A method of receiving data, comprising:
   receiving a common input signal;
   multiplying the common input signal by a plurality of respective vectors to produce a plurality of respective sub-channel signals, wherein each of the respective vectors corresponds to a sequence having N elements and each of the respective vectors is substantially orthogonal to the other respective vectors, and wherein the respective vectors are substantially orthogonal during a finite time interval corresponding to each sequence of N elements;
   recovering synchronization information from each of the sub-channel signals;
   integrating each of the respective sub-channel signals in accordance with the recovered synchronization information recovered from the respective sub-channel signal to produce respective integrated sub-channel signals, wherein each of the respective integrated sub-channel signals has a data rate substantially less than a data rate of the common input signal; and
   converting each of the respective integrated sub-channel signals into a digital signal.

29. The method of receiving data of claim 28, wherein N is an even integer.

30. The method of receiving data of claim 28, wherein at least one of the respective sub-channel signals corresponds to at least one frequency band that at least partially overlaps a frequency band for at least one other of the respective sub-channel signals.

31. The method of receiving data in claim 28, wherein at least one of the respective sub-channel signals corresponds to a group of frequency bands at least one of which substantially overlaps a frequency band for at least one other of the respective sub-channel signals.

32. The method of receiving data of claim 28, wherein the sequence corresponds to a row of a Hadamard matrix of order N.

33. The method of receiving data of claim 28, further comprising equalizing the common input signal prior to multiplying the common input signal by the plurality of respective vectors.

34. The method of receiving data of claim 28, further comprising equalizing each of the respective integrated sub-channel signals.

35. The method of receiving data of claim 28, farther comprising correcting for phase differences between at least two of the respective integrated sub-channel signals by adjusting the synchronization information determined from at least one of the corresponding respective integrated sub-channel signals.

36. The method of receiving data of claim 28, further comprising correcting for phase differences between at least two of the respective sub-channel signals by varying the phase of at least one of the respective vectors multiplying the common input signal.

37. The method of receiving data of claim 28, further comprising receiving a clock input signal from an external source that also generates the common input signal using the clock input signal.

38. A data receiving subsystem, comprising:
   a mechanism configured to receive a common input signal, to multiply the common input signal by a plurality of respective vectors to produce a plurality of respective sub-channel signals, to recover synchronization information from each of the respective sub-channel signals, to integrate each of the respective sub-channel signals in accordance with the synchronization information recovered from the respective sub-channel signal to produce respective integrated sub-channel signals, and to convert the respective integrated sub-channel signals into digital signals, wherein an inverse of the data rate of the common input signal is an integer multiple of a bit time of each of the respective vectors, each of the respective vectors corresponds to one of a plurality of sequences of binary numbers with a number of elements N that is an even integer, each element of the respective vectors corresponds to one of two voltage levels, each of the respective vectors is substantially orthogonal to other respective vectors during a finite time interval of N times a bit time for each of the respective vectors, each of the respective sub-channel signals is integrated for substantially the finite time interval, each of the respective sub-channel signals corresponds to at least one frequency band that at least partially overlaps a frequency band for at least one other of the respective sub-channel signals and each of the respective integrated sub-channel signals has a data rate substantially less than a data rate of the common input signal.

39. The data receiving subsystem of claim 38, wherein the sequence corresponds to a row of a Hadamard matrix of order N.

* * * * *

UNITED STATES PATENT AND TRADEMARK OFFICE
CERTIFICATE OF CORRECTION

PATENT NO. : 7,599,390 B2
APPLICATION NO. : 10/899720
DATED : October 6, 2009
INVENTOR(S) : Sudhakar Pamarti It is certified that error appears in the above-identified patent and that said Letters Patent is hereby corrected as shown below:

Column 10, line 15, please delete "farther" and insert -- further --.

Column 10, line 22, please delete "farther" and insert -- further --.

Column 12, line 41, please delete "farther" and insert -- further --.

Signed and Sealed this

Fifteenth Day of December, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,599,390 B2 | Page 1 of 1 |
| APPLICATION NO. | : 10/899720 | |
| DATED | : October 6, 2009 | |
| INVENTOR(S) | : Sudhakar Pamarti | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1445 days.

Signed and Sealed this

Twenty-eighth Day of September, 2010

David J. Kappos
*Director of the United States Patent and Trademark Office*